United States Patent Office 2,991,602
Patented July 11, 1961

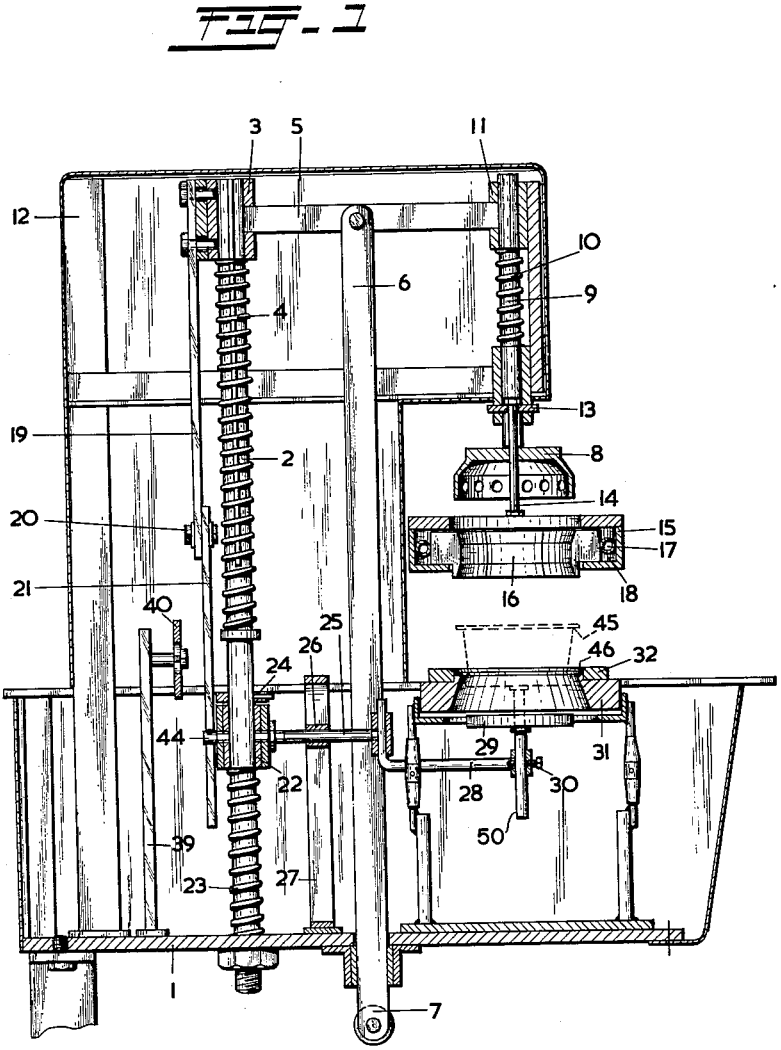

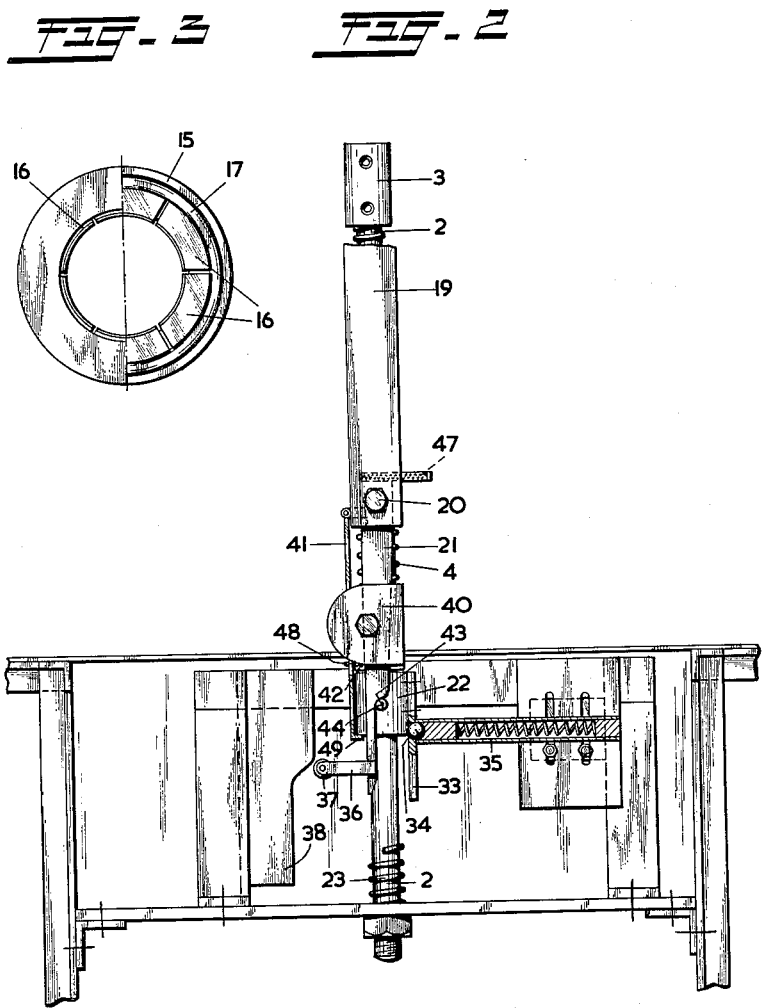

2,991,602
PROCESS FOR PRODUCING A FOLDED RIM ON A CONTAINER OF PLASTIC MATERIAL, AS WELL AS AN APPARATUS FOR CARRYING OUT THIS PROCESS
Kornelis van de Kerke, 20 Zonneland, Hilversum, Netherlands, and Dirk van de Kerke, 39 Oudestraat, Kampen, Netherlands
Filed Mar. 17, 1958, Ser. No. 721,834
Claims priority, application Netherlands Mar. 21, 1957
14 Claims. (Cl. 53—39)

In the packaging industry it is nowadays well known for the packaging of foodstuffs to use containers of plastic material, e.g. of polyvinyl chloride, which containers are produced by deep-drawing and at the rim have a horizontal flange, on which a lid of similar material is fixed by means of heat. This fixing can be effected by high-frequency welding or in the manner of the normal heat-sealing system, in which therefore the parts to be joined are softened by heat to such a degree that they adhere to each other. After the lid has been fitted, the previously flat horizontal flange is usually deformed to an undulating shape, and this flange fails to impart the requisite strength to the container, which already consists of limp material. This strength might be obtained if the flange could be folded back, but this is extremely difficult, since after the lid has been fixed by means of heat the container is so soft that it cannot be handled without a permanent deformation resulting from this. Attempts have therefore been made to find the solution of this problem in a different direction by pressing around the flange a metal ring, which imparted the necessary strength to the container.

The invention has for its object to find a simple and effective solution for the problem of the strengthening and improvement of the upper rim of the container.

According to the invention this object is achieved by the feature that immediately after the sealing of the container the rim, which is still soft, is folded back with simultaneous cooling. This cooling is preferably effected by the member which carries out the folding, and according to the invention the container to this end can be passed, immediately after the sealing, with its upper rim through a cooling ring fitting around the upper rim. Because the container is passed through the ring immediately after the sealing and this ring effects the folding with simultaneous cooling, it is not necessary to take the container from the machine immediately after the sealing, so that the risk of damage to the rim, which is still soft immediately after the sealing, is avoided. The folded rim imparts good strength to the upper rim of the container, while at the same time its appearance is improved.

The apparatus for carrying out this process consists of a table for the container, which is vertically movable through a supporting ring for the flange of the container, as well as a heated sealing ring or sealing electrode located above the table, which ring is vertically movable, and this apparatus is characterized according to the invention in that above the table is located a cooling ring, through which the sealing ring or electrode can be moved and which ring may be within the range of movement of the container on the table. The sealing ring or electrode can therefore be operated in the normal way, and after the sealing operation the container can be moved upwards through the cooling ring by means of the table, the flange being folded back and at the same time cooled, so that it stiffens in its folded state. In this apparatus use is preferably made of a sealing ring which effects the sealing by means of heat, since the high-frequency welding process, which is very frequently applied in this field, is inefficient because break-down very often tends to occur in connection with the fillers of the plastic material and owing to the fact that between the parts to be welded there are traces of the mass to be packed in the container. The table can be movable between an uppermost position and a lowermost position, in which latter position it is subject to spring action and is arrested by a locking device. In this case provision only has to be made for the locking to be undone after the sealing of the container, upon which the table will force the container upwards into the cooling ring. The cooling ring may be suspended from the mechanism of the sealing ring and the moving mechanism of these rings may be such that the movement of the table to its lowermost position is controlled by it and during the backward movement the locking is undone when the sealing ring has passed through the cooling ring, in consequence of which it is avoided that the table forces the container into the cooling ring before the sealing ring has moved away from it.

The cooling ring itself preferably consists of a number of segments which are forced radially inwards by an elastic member when the sealing ring passes through, and when the flange of the container is folded back, these segments are therefore forced radially outwards, so that they can exercise a positively radial force upon the rim to be folded back. The elastic member may consist of latex foam or plastic foam, but it may also be formed by an elastic cooling pipe, which then at the same time effects the cooling of the segments.

The invention will now be elucidated further with reference to the drawings, which illustrate an embodiment of the apparatus for carrying out the process.

FIG. 1 is a vertical cross-section through the apparatus according to the invention.

FIG. 2 is a back elevation of a part of the machine.

FIG. 3 is a top view of the cooling ring, partly cut open.

All the drawings, especially FIGS. 1 and 2, are diagrammatic, i.e. all those components which are superfluous for the elucidation have been omitted.

The machine consists of a frame 1, in which there is fixed a column 2, on which column there is a guide bush 3, which is forced upwards by a spring 4 and has a horizontal lever 5, which is engaged by a rod 6, which is connected at the lower end 7 with a pedal mechanism not shown in the drawing. The end of the horizontal lever 5 carries the sealing ring 8, the heating mechanism of which is not shown, said sealing ring being suspended from a vertical rod 9. The rod 9 is kept in a lowermost position by a spring 10, but can move upwards in relation to the lever 5 with simultaneous compression of the spring 10, the rod 9 then sliding through the bush 11 at the end of the lever 5. This elastic suspension is necessary to obtain elastic compression of the sealing ring when the latter, with a view to the sealing of a container, has to press the parts of the container together. The upper part of the machine is surrounded by a casing 12.

On either side of the suspension mechanism of the sealing ring 8 there is a horizontal flange 13, from which by means of the bolts 14 a second ring is suspended in such a way that the latter can move in relation to the sealing ring 8. This second ring is the so-called cooling ring 15, which has a number of segments 16, which are compressed radially by an elastic coil 17 surrounding the segments, through which coil may flow a cooling medium, the supply and discharge of which are not shown. However, the space 18 may also contain some other elastic member, such as e.g. latex foam.

Secured to the upper bush 3 is a rod 19, which has a pivot at 20, where a continuation 21 of the rod has been pivotally suspended, said continuation 21 cooperating in the manner shown in FIG. 2 and yet to be described with a bush 22, which is also adapted to move along the column 2 and is kept forced upwards by a spring 23 against an abutment 24 fixed on the column.

Fitted to this bush 22 is a horizontal arm 25, which is locked against rotation about the axis of the column 2 by a block 26, which is vertically movable in a slot of a member 27 secured on the frame 1. Secured at the end of this arm 25 is a holder 28, on which the table 29 has been adjustably fitted. The adjustment can be obtained by the place where the downwardly directed rod 50 of the table 29 is fixed by means of the screw 30. In FIG. 1 the table is shown in its lowermost locked position, the non-locked position being shown in broken lines. In the non-locked position the upper surface of the table is at the same level as the supporting rim of a ring 31, for the flange of the container which ring has been fixed in the frame of the machine.

Fitted on this ring is a second ring 32, which serves as stop ring. FIG. 2 shows a back elevation of the lower part of the machine, all superfluous components having been omitted, in order to elucidate the control of the table by the operating mechanism of the sealing ring. This drawing shows the column 2 with the bush 22 of the table, which bush is movable thereon. Attached to this bush is a strip 33 with an opening 34, which cooperates with a spring-biased ball-lock secured to the frame and denoted by 35. The continuation 21 of the rod 19 at the lower end carries an arm 36 with a roller 37, which cooperates with a guide 38, which is fixed in the frame. Further there is in the frame a support 39, to which is fixed a cam disc 40, which is to be seen in FIG. 1 as well as in FIG. 2. This cam disc controls the movement of a pivotally suspended and hookshaped member 41, which is pivotally connected with the downwardly extending rod 19 and is pulled towards the column by a spring 42. The rod 21 has a notch 43, which cooperates with a pin 44 extending from the bush 22.

The apparatus operates as follows. When the table 29 is in the uppermost position denoted by broken lines in FIG. 1, a container with its contents is placed on it, as also denoted by broken lines in FIG. 1. On this container the sealing plate is laid, and subsequently by operation of the pedal (not shown) the rod 6 is moved downwards, in consequence of which the sealing ring and the cooling ring move downwards simultaneously, but at the same time the rod 21 engages with its notch 43 about the pin 44 and thus also causes the table to move downwards, until the ball of the locking device bounds into the opening 34 and arrests the table in the position shown in full lines, in which position the flange 45 of the container rests on the supporting rim 46 of the ring 31. The guide 38 has been so constructed that the rod 21 at the moment of locking can swing away under the influence of the spring 47, so that upon the further downward movement of the sealing ring and accordingly of the rod 21 the table is not forced downwards any further. During this downward movement a pin 48 of the hook-shaped member 41 has been in contact with the cam disc 40, which has caused the hook-shaped member to be swept sideways to the left in FIG. 1, so that it was kept out of contact with the bush 22 and does not turn towards the column again under the influence of the spring 42 until the hook 49 has reached a point situated beneath the lower rim of the bush 22. Thus the table is now in its lowermost position, and upon the further downward movement the cooling ring 15 comes to rest on the stop ring 32, upon which the sealing ring 8 subsequently passes through the cooling ring and comes to rest on the flange of the container, thus effecting the sealing by means of its heat. After the container has been sealed, the pedal is moved in the opposite direction, the sealing ring moving upwards under the influence of the spring 4 and thus passing back through the cooling ring again. During this upward movement the hook 49 of the hook-shaped member 41 comes into contact with the lower end of the bush 22, which happens at a moment when the sealing ring 8 is above the cooling ring again, but the latter still rests on the supporting ring 32. The hook 49 now carries along the bush 22 until the ball-lock 35 has been put out of operation, upon which the spring 23 causes the table to move upwards, the container with the flange that is still soft snapping into the cooling ring, while the segments of the cooling ring cause the flange to be folded back in the downward direction and at the same time to be stiffened by cooling. In this process the segments are forced radially outwards somewhat, since their inner diameter is slightly smaller than the outer diameter of the top of the container. During the further upward movement of the sealing ring, it will subsequently carry along the cooling ring to its initial positions, so that the container then falls out of the cooling ring by its own weight and can be removed. The rod 21 is then swung back again to its initial position by the guide 38 and the machine is ready again to seal the next container.

FIG. 3 shows the cooling ring 15, in top view, the right half of the upper covering ring being omitted so as to show the segments clearly.

What we claim is:

1. A process for producing a folded rim on a container of thermoplastic material having a horizontal flange at the top thereof, comprising placing a lid of similar material on said flange, heating said lid and flange to seal said container, and simultaneously folding back and dynamically cooling said flange and the overlying part of said lid.

2. A process for sealing and for producing a folded rim on a container of thermoplastic material, said container having a horizontal flange extending substantially completely around the top thereof, which comprises placing said container on a support, placing a lid of thermoplastic material over the top of the container and flange, heating the flange and the portion of the lid lying over the flange to soften the material, and, while the material is still soft from said heating, simultaneously folding back and dynamically cooling the entire flange and the portion of the lid overlying said flange.

3. A process for sealing and for producing a folded rim on a container of thermoplastic material, said container having a horizontal flange extending substantially completely around the top thereof, which comprises supporting the container and flange from below, placing a lid of thermoplastic material over the top of the container and flange, heating the flange and the portion of the lid overlying the flange to soften the material, and, while the material is still soft, lifting the flange off its support and simultaneously folding back and dynamically cooling the entire flange and the portion of the lid overlying said flange.

4. A process for sealing and for producing a folded rim on a container of thermoplastic material, said container having a horizontal flange extending substantially completely around the top thereof, which comprises supporting the container and flange from below, placing a lid of thermoplastic material over the top of the container and flange, heating the flange and the portion of the lid overlying the flange to soften the material, and, while the material is still soft, lifting the flange off its support and simultaneously folding back and dynamically cooling the entire flange and the portion of the lid overlying said flange by means of a cooled shaping element substantially coextensive with said flange.

5. Apparatus for producing a folded rim on a container of thermoplastic material having a horizontal flange at the top thereof, comprising a table, a supporting ring for the flange of the container, ring-like sealing means above said table and ring, ring-like cooling and folding means above said table and ring, and means for mounting said table, ring, sealing means, and cooling and folding means in alignment and for moving them relatively towards and away from each other.

6. The apparatus of claim 5, said sealing means having external lateral dimensions smaller than the interior of said ring-like cooling and folding means, said mounting and moving means comprising a vertically movable support for said sealing means, and a lost-motion connecting means securing said cooling and folding means to said support in a position below said sealing means when said support is in an upper position thereof, said cooling and folding means in its lower position engaging said supporting ring.

7. The apparatus of claim 6, said mounting and moving means comprising a vertically movable support for said table, means for locking said table in a lower position, and means for yieldingly urging said table upwardly while in said lower position.

8. The apparatus of claim 7, said mounting and moving means comprising means for lowering said first-mentioned support and said table support simultaneously, said lowering means having means for releasing said locking means when said sealing means has been raised to a position above said cooling and folding means and before said cooling and folding means has been withdrawn from the said lower position thereof.

9. The apparatus of claim 8, said mounting and moving means comprising an upstanding column, a slidable collar on said column, a rod secured to and extending downwardly from said collar, a second rod extending downwardly, and a horizontal pivot securing said rods in general alignment, said support for said table comprising a second collar on said column below said first collar, a pin on said second collar, and means on said second rod for engaging said pin.

10. The apparatus of claim 9, a hook depending from and pivoted to said first rod, and cam means for swinging said hook outwardly upon downward movement of said first collar, said hook engaging said second collar upon upward movement of said first collar, said locking means comprising a spring-pressed detent.

11. An apparatus according to claim 5, said cooling and folding means comprising a number of segments, and an elastic member radially inwardly urging said segments.

12. The apparatus of claim 5, said cooling and folding means comprising segments, and elastic latex foam urging said segments radially inwardly.

13. The apparatus of claim 5, said cooling and folding means comprising segments, and elastic plastic foam urging said segments radially inwardly.

14. The apparatus of claim 11, said elastic member comprising a coiled tube.

References Cited in the file of this patent

UNITED STATES PATENTS

| | | |
|---|---|---|
| 1,689,018 | Froidevaux | Oct. 23, 1928 |
| 2,218,585 | Merkle | Oct. 22, 1940 |
| 2,451,273 | Bright | Oct. 12, 1948 |
| 2,691,474 | Olson | Oct. 12, 1954 |
| 2,712,717 | Keller | July 12, 1955 |
| 2,846,831 | Dobbins | Aug. 12, 1958 |
| 2,859,575 | Lehmann | Nov. 11, 1958 |